US007917556B2

(12) United States Patent
Moro et al.

(10) Patent No.: US 7,917,556 B2
(45) Date of Patent: Mar. 29, 2011

(54) METHOD AND SYSTEM FOR TRACKING EMPLOYEE AFFIRMATIONS

(75) Inventors: Matthew P. Moro, Westport, CT (US); Xiaohua Qian, Ossining, NY (US)

(73) Assignee: UBS AG, Zurich (CH)

( * ) Notice: Subject to any disclaimer, the term of this patent is extended or adjusted under 35 U.S.C. 154(b) by 207 days.

(21) Appl. No.: 10/282,711

(22) Filed: Oct. 29, 2002

(65) Prior Publication Data
US 2004/0083220 A1 Apr. 29, 2004

(51) Int. Cl.
*G06F 17/00* (2006.01)
(52) U.S. Cl. ... 707/999.102; 707/999.103; 707/999.101; 707/999.105; 707/999.107
(58) Field of Classification Search ............... 707/104.1, 707/103 R, 100, 102, 1, 101; 709/225; 705/44–45
See application file for complete search history.

(56) References Cited

U.S. PATENT DOCUMENTS

| | | | | | |
|---|---|---|---|---|---|
| 5,576,951 | A | * | 11/1996 | Lockwood | 705/27 |
| 5,832,497 | A | * | 11/1998 | Taylor | 707/104.1 |
| 5,987,440 | A | * | 11/1999 | O'Neil et al. | 705/44 |
| 6,161,139 | A | * | 12/2000 | Win et al. | 709/225 |
| 6,505,183 | B1 | * | 1/2003 | Loofbourrow et al. | 706/45 |
| 6,505,783 | B1 | * | 1/2003 | Lazarski et al. | 239/246 |
| 2002/0042771 | A1 | * | 4/2002 | Shields et al. | 705/37 |
| 2002/0046074 | A1 | * | 4/2002 | Barton | 705/8 |

* cited by examiner

*Primary Examiner* — Sana Al-Hashemi
(74) *Attorney, Agent, or Firm* — Proskauer Rose LLP (57) ABSTRACT

A system is provided for tracking employee disclosure information and includes an employee database for storing employee status information. Also included is a previous disclosure database for storing any previous disclosures provided by the employee. Finally, a disclosure engine is included for determining disclosure requirements for the employee based on the employee status information. The disclosure engine also receives from the previous disclosure database the any previous disclosures provided by the employee for determining any additional disclosure required by the employee to satisfy the disclosure requirements. The disclosure engine also forwards to the employee a disclosure form for providing the additional disclosure.

22 Claims, 8 Drawing Sheets

FIG. 1

Affirmation Project

Registration Information

Registered

Since your date of hire have you been:

- arrested, arraigned, indicted or convicted of, any criminal offense (other than a minor traffic violation)
- charged and/or convicted of a misdemeanor involving investments or investment related business, fraud, false statements or omissions, wrongful taking of property, bribery, perjury, forgery, counterfeiting, extortion or a conspiracy to commit any of these offenses
- charged or convicted of any felony
- notified that you are the subject of a Regulatory Investigation
- filed for bankruptcy, judgements or liens
- denied, paid out on, or bond revoked
- named in a customer initiated Arbitration/Civil Action
- involved in any disciplinary action involving suspension, limitation on activities, withholding commissions, or imposition of fines in excess of $2,500

Yes / No

[ Submit ] [ Reset ]

Legal & Compliance

- Home
- Log in
- Brokerage Accounts
- Registration Information
- Outside Business Activities
- Receipt of Policies
- Log off

FIG. 2

Affirmation Project

Registration Information

Unregistered

Since your date of hire have you been:

| | Yes | No |
|---|---|---|
| arrested, arraigned, indicted or convicted of, any criminal offense (other than a minor traffic violation) | ○ | ○ |
| the subject of any disciplinary action involving suspension, limitation on activities, withholding commissions, or imposition of fines in excess of $2,500 | ○ | ○ |
| the subject of any written customer complaint involving allegations of theft or misappropriations of funds, securities or forgery | ○ | ○ |
| in violation of any provision of any securities law, regulation or any agreement or rule, standards of conduct of any government agency, self-regulatory organization, business or professional organization, or engaged in conduct which was inconsistent with just and equitable principles or detrimental to the interest and welfare of the Exchange | ○ | ○ |
| denied registration or expelled, enjoined, directed to cease and desist, suspended or otherwise disciplined by any securities, insurance or commodities industry regulatory or self-regulatory organization or is denied membership or continued membership in any self-regulatory | ○ | ○ |

[Submit] [Reset]

Legal & Compliance
- Home
- Log in
- Brokerage Accounts
- Registration Information
- Outside Business Activities
- Receipt of Policies
- Log off

METHOD AND SYSTEM FOR TRACKING EMPLOYEE AFFIRMATIONS

BACKGROUND

The following invention relates to a system and method for tracking employee disclosures and affirmations.

Organizations generally require their employees to abide by a Code of Conduct that governs various aspects of employee behavior within the organization. Typically, each employee must acknowledge and affirm the contents of the organization's Code of Conduct as a condition of employment. Employees typically provide such an affirmation at the time of employment by signing a statement acknowledging that the employee has read the Code of Conduct and will abide by its contents.

In some organizations, aside from the organization's Code of Conduct, employees may have to provide information to comply with various other rules and regulations associated with the operation of the organization. For example, in financial institutions, all employees are typically required to disclose to the institution on a periodic basis information regarding brokerage accounts the employee uses to trade in securities. Also, if the institution is a broker-dealer, employees that are brokers registered with the National Association of Securities Dealers (NASD) are required to periodically update a NASD form U-4 that asks, in part, whether the employee was arrested, involved in an arbitration, filed for bankruptcy or is the subject of an SEC investigation. Employees of a broker-dealer that are not registered brokers are required to periodically update a New York Stock Exchange form RE-3 that requests from the employee a subset of the information that a registered broker is required to provide.

In addition to disclosure requirements resulting from a financial institution's broker -dealer status, some employees may be required to disclose information and affirm certain guidelines as a result of the area within the institution in which the employee works. For example, employees that perform a market making function in Nasdaq over-the-counter securities are required to read and agree to abide by a stipulation and order entered into by several broker-dealers and the Department of Justice. This order, requires employees to abstain from, among other things, fixing prices for any Nasdaq security. Additionally, employees that work in corporate finance must agree to abide by the firm's Corporate Finance Permanent Insiders Policy. This policy places restrictions on the personal securities trades allowed by a corporate finance employee. These restrictions are designed to avoid potential conflicts of interest that may arise where a corporate finance employee buys or sells the securities of a company for which they may possess material non-public information. Furthermore, all employees are generally obligated to disclose any outside directorships, business activities and private investments as these activities may result in conflicts of interest. Aside from the above, employees may be required to provide additional disclosures and affirmations as required by the organization.

The prior art approach of gathering the various affirmations and disclosures from employees typically includes a compliance department sending each employee paper forms that request the desired information and direct the employee to sign a statement acknowledging that employee has read and consents to any relevant rules and regulations. The problem, however, with the prior art approach is that because each employee within the organization is required to disclose information and affirm policies and procedures based on the status of the employee, the status of the organization in which the employee works and the area within the organization in which the employee works, each employee may require different disclosure/affirmation forms. To meet this need, the compliance department either can send all forms to all employees and have each employee fill out only the relevant forms or individually tailor a set of disclosure/affirmation forms for each employee. Either approach is wasteful and time consuming.

Another drawback with the prior art approach is that because for each category of disclosure/affirmation a particular employee may be required by law or organizational policy to disclose/affirm on a periodic basis or by certain times, the compliance department must seek out disclosures/affirmations at different times for different employees in order to meet such time requirements. This places a large burden on compliance department personnel, especially for large organizations. Furthermore, a failure to procure the required disclosures/affirmations may result in penalties being assessed to the organization, in certain circumstances.

Accordingly, it is desirable to provide a more efficient and time-saving system and method for tracking employee disclosures and affirmations.

SUMMARY OF THE INVENTION

The present invention is directed to overcoming the drawbacks of the prior art. Under the present invention, a system is provided for tracking employee disclosure information and includes an employee database for storing employee status information. Also included is a previous disclosure database for storing any previous disclosures provided by the employee. Finally, a disclosure engine is included for determining disclosure requirements for the employee based on the employee status information. The disclosure engine also receives from the previous disclosure database the any previous disclosures provided by the employee for determining any additional disclosure required by the employee to satisfy the disclosure requirements. The disclosure engine also forwards to the employee a disclosure form for providing the additional disclosure.

In an exemplary embodiment, the disclosure engine receives from the employee the any additional disclosure.

In another exemplary embodiment, the disclosure engine updates the previous disclosure database based on the any additional disclosure.

In yet another exemplary embodiment, the disclosure engine includes a disclosure list, the disclosure list storing at least one disclosure type that the employee is required to provide.

In still yet another exemplary embodiment, the disclosure list includes at least one from a group of disclosure types including brokerage information, registration information, outside business activities, code of ethics, personal account dealing policy, compliance manual and political contributions rule.

In an exemplary embodiment, the disclosure list includes a time schedule for receiving from the employee the disclosure information corresponding to the at least one disclosure type.

In another exemplary embodiment, the previous disclosure database includes a time when the any previous disclosures were provided by the employee.

In yet another exemplary embodiment, the disclosure engine determines whether any additional disclosures are required by the employee based on the time schedule and the time when the any previous disclosures were provided by the employee.

In still yet another exemplary embodiment, the system includes an access device in communications with the disclosure engine for updating the disclosure list for implementing a new disclosure policy.

Accordingly, a system and method for tracking employee disclosures and affirmations is provided.

In an exemplary embodiment, the system includes a login module and an employee access device wherein the employee accesses the system by providing employee identification information to the login module via the employee access device and wherein the login module provides the disclosure engine with the employee identification information for retrieving the employee's status information from the employee database.

In another exemplary embodiment, the employee access device is in communications with the disclosure engine for access the any previous disclosures.

In yet another exemplary embodiment, the disclosure engine determines whether any disclosure is required by the employee and communicates the disclosure requirements to the employee.

In still yet another exemplary embodiment, wherein the disclosure engine communicates the disclosure requirements to the employee via the employee access device.

In an exemplary embodiment, the disclosure engine communicates the disclosure requirements using a method selected from the group including electronic mail, instant messaging, facsimile web access and mail.

Under the present invention, a method is provided for tracking employee disclosure information and includes the step of determining a status of the employee. Next, disclosure requirements for employee are determined based on the status. Next, any previous disclosures provided by employee are identified. Next, any additional disclosure required by said employee to satisfy said disclosure requirements calculated. Finally, a disclosure form for providing said additional disclosure is forwarded to the employee.

In an exemplary embodiment, the method includes the step of receiving from the employee the additional disclosure.

In another exemplary embodiment, the method includes the step of updating the previous disclosures based on the any additional disclosure.

In yet another exemplary embodiment, the method includes the step of storing a time when the any previous disclosures were provided by the employee.

In still yet another exemplary embodiment, the method includes the step of determining whether any additional disclosures are required by the employee based on the time schedule and the time when the any previous disclosures were provided by the employee.

In an exemplary embodiment, the method includes the steps of providing employee identification information to the login module via said employee access device and retrieving the employee status information based on the employee identification information.

In another exemplary, the method includes the steps of periodically determining whether any additional disclosure is required by the employee and communicating the disclosure requirements to the employee.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which:

FIG. 2 is a registration information form for registered employees used in an exemplary embodiment of the present invention;

DETAILED DESCRIPTION OF THE PREFERRED EMBODIMENTS

Figure 1:
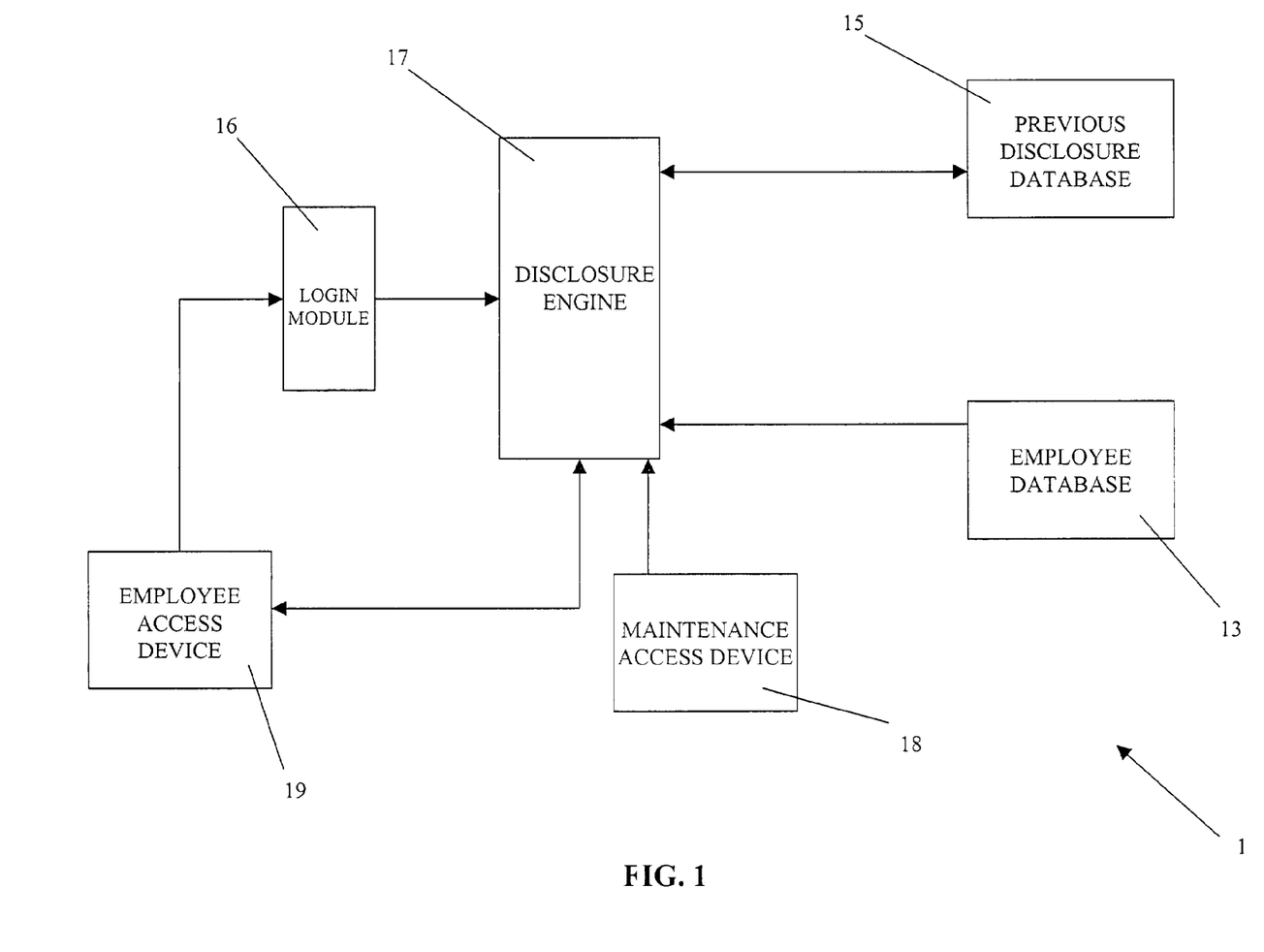
FIG. 1 is a disclosure system of the present invention.

Referring now to FIG. 1, there is shown a disclosure system I of the present invention. System 1 includes an employee database 13 that maintains a list of all the employees affiliated with the organization that is operating system 1. Associated with each employee in the list of employees is status information for each employee. The status information may include, by way of non-limiting example, the date the employee joined the organization, the department within the organization for which the employee works, whether the employee is a registered broker and any other information that may be used to determine the disclosure and/or affirmations an employee is required to provide to the organization.

System 1 also includes a previous disclosure database 15 that maintains a list of all the previous disclosures and affirmations each employee has previously provided to the organization. The previous disclosures and affirmations provided by the employee may have been provided, for example, when the employee initially joined the organization or sometime thereafter. Also, the previous disclosures included in previous disclosures database 15 may have been entered into previous disclosures database 15 either manually or via operation of system 1, as will be described.

Also included in system 1 is a disclosure engine 17 that receives status information from employee database 13 and previous disclosure information from previous disclosure database 15 for the purpose of managing the employee disclosure and affirmation process within the organization. In particular, upon receiving from employee database 13 employee status information for a particular employee, disclosure engine 17 determines the disclosures and affirmations that the particular employee is required to give. For example, if disclosure engine 17 determines that the particular employee is a registered broker, then disclosure engine 17 determines that the employee must disclose the information requested in a NASD form U-4. Next, disclosure engine 17 accesses previous disclosure database 15 for determining when, if ever, the employee has disclosed the required information. If disclosure engine 17 determines that the employee has either not disclosed the required information or that the previous disclosures are not current, then disclosure engine 17 communicates to the employee operating an employee access device 19 (for example, a personal computer) a form via which the employee can disclose the required information.

Referring now to FIG. 2, there is shown a form 21, according to an exemplary embodiment, via which an employee that is a registered broker may disclose the information required for the NASD form U-4. Form 21 includes a series of questions 23 and a corresponding set of Yes/No radio buttons 25 via which the employee can answers questions 23. Once the employee answers all of questions 23, the employee activates a submit button 27 to send the disclosure to disclosure engine 17. In this way, the employee has disclosed the information required from registered brokers.

Figure 3:
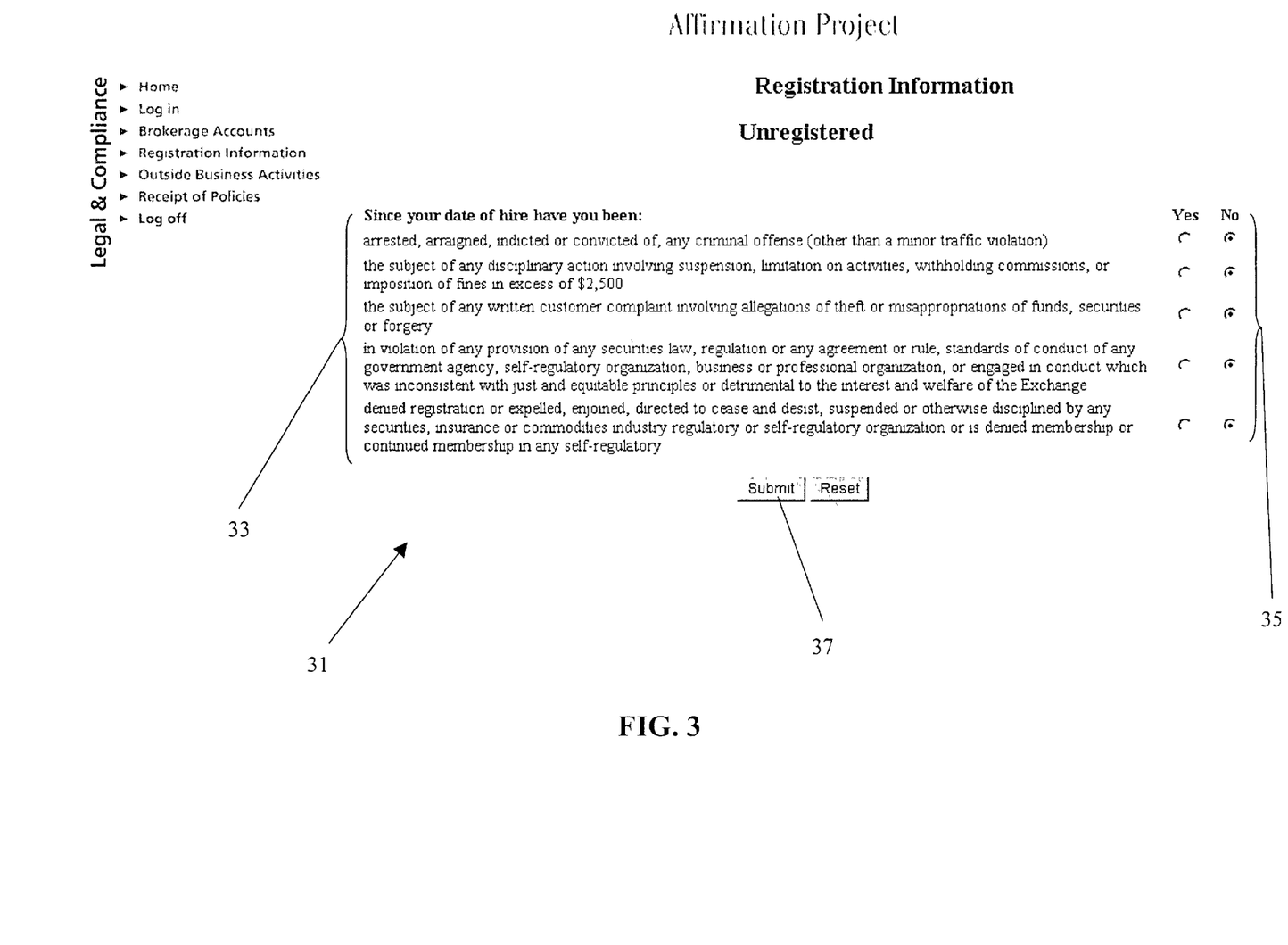
FIG. 3 is a registration information form for unregistered employees used in another exemplary embodiment of the present invention.

Alternatively, if disclosure engine 17 determines that the particular employee is not a registered broker and that the employee previous disclosures pertaining to form RE-3 are lacking, then disclosure engine 17 communicates to the employee a form suitable for disclosing the required information. Referring now to FIG. 3, there is shown a form 31, according to an exemplary embodiment, via which an employee that is not a registered broker may disclose the information required for form RE-3. As with form 21, form 31 includes a series of questions 33 and a corresponding set of Yes/No radio buttons 35 via which the employee can answers questions 33. Once the employee answers all of questions 33, the employee activates a submit button 37 to send the disclosure to disclosure engine 17. In this way, the employee has disclosed the information required from non-registered brokers.

Upon receiving disclosure/affirmation information from an employee, disclosure engine 17 then updates previous disclosure database 15 so that previous disclosure database 15 reflects the most recent disclosure provided by the employee and the date the disclosure was provided.

In order to track the disclosures/affirmations that employees are required to provide and determine whether the previous disclosures/affirmations are current, disclosure engine 17 maintains a disclosure list that includes the various types of disclosures each employee type within the organization must provide. For example, the disclosure list maintained by disclosure engine 17 may contain an entry requiring that a registered broker must provide sufficient disclosure so that a NASD form U-4 may be completed. Similarly, the disclosure list may thus include any other disclosure/affirmation type for any employee type that are needed to satisfy the organization's disclosure/affirmation requirements as well as the requirements of any third-party organizations.

In an exemplary embodiment, the disclosure list maintained by disclosure engine 17 also includes a time by which each disclosure must be received from any given employee in order to meet either the organization's deadlines or the deadline's of any third-party. So, for example, the organization may require that each employee affirm the organization's Code of Conduct once per year. The entry in the disclosure list pertaining to the Code of Conduct will then reflect this disclosure requirement. To determine whether a particular employee is required to affirm the Code of Conduct, disclosure engine 17 checks previous disclosure database 15 to determine the last time the employee affirmed the Code of Conduct and, if it was not affirmed by the employee within the last year, disclosure engine 17 then generates a form that is sent to the employee prompting the employee to review and affirm the organization's Code of Conduct.

In an exemplary embodiment, system 1 includes a maintenance access device 18 (for example, a personal computer) that may be used to change the entries in the disclosure list maintained by disclosure engine 17. By operating maintenance access device 18, the organization operating system 1 may update the disclosure list including the types of disclosures/affirmations that are required, and the time such disclosures/affirmations should be received, for any given employee type. In this way, the organization may modify disclosure/affirmation policies as circumstances dictate.

An employee operating employee access device 19 may interact with system 1 in a number of ways. In one embodiment, the employee uses employee access device 19 to provide a user id and password to a login module 16 that performs a single-sign on login process for the organization's entire network of systems and applications. Once a particular employee logs in via login module 16, login module 16 communicates to disclosure engine 17 that the particular employee is logged into the organization's network and also provides disclosure engine 17 with the employee's id. Upon receiving this information, disclosure engine 17 then begins the process of accessing employee database 13 to retrieve the employee's status information and also accessing previous disclosure database 15 to determine the status of the employee's previous disclosures/affirmations. As described above, disclosure engine 17 then determines whether the particular employee is required to provide any further disclosures/affirmations. If it is determined that additional disclosure is required, disclosure engine 17 sends to employee access device 19 a form via which the employee may provide the required disclosure/affirmation.

Figure 8:
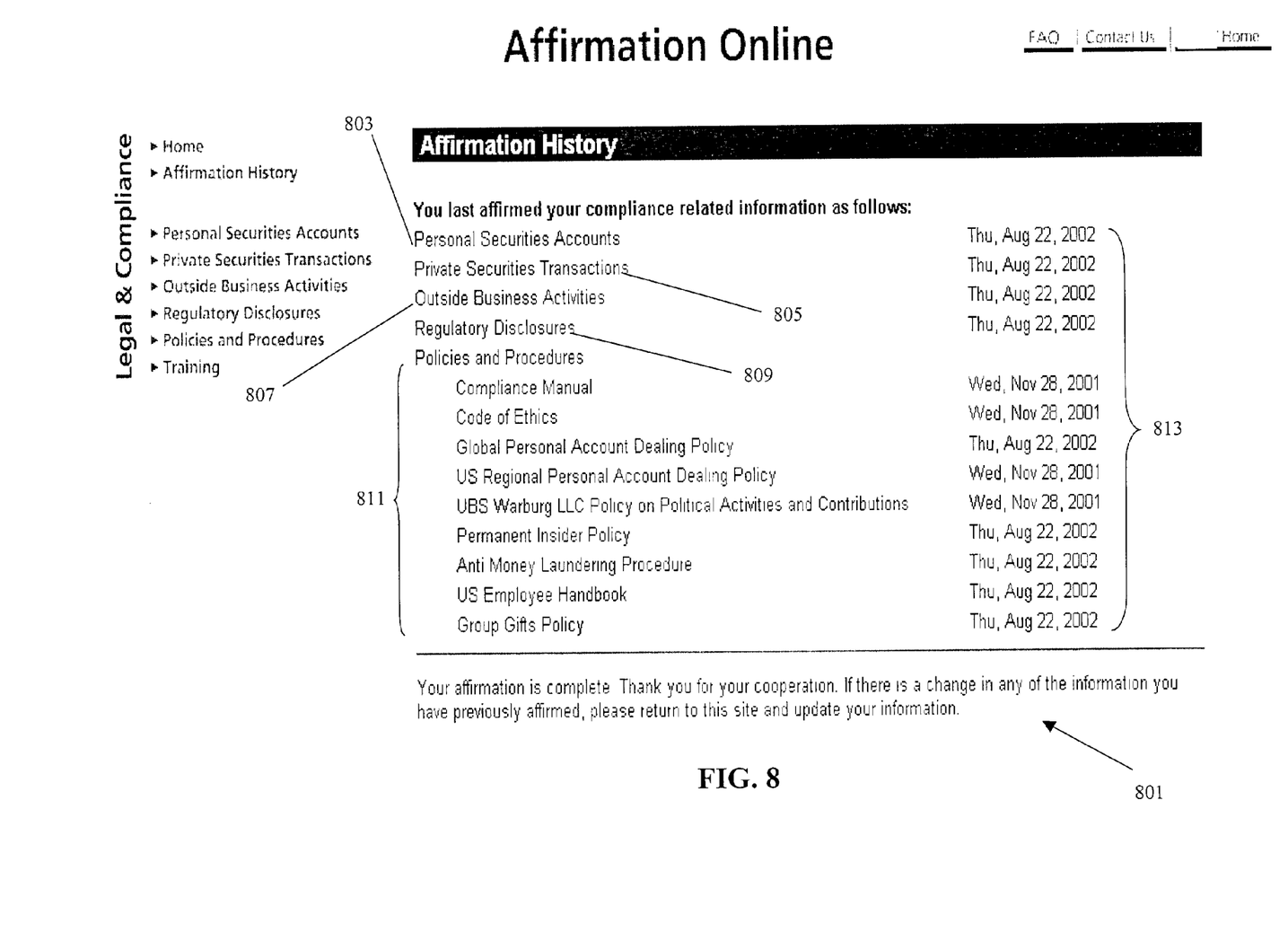
FIG. 8 is a screenshot in which an employee's previous disclosures/affirmations are displayed in a format according to an exemplary embodiment.

In another embodiment, an employee may log in directly to system 1 to view the current status of the employee's disclosures/affirmations to determine whether any additional disclosures/affirmations are required. In this embodiment, the employee operates employee access device 19 to access disclosure engine 17 directly (or via a user-interface, not shown) to query the status of the employee's disclosures/affirmations. Upon receiving the status request, disclosure engine 17 identifies the employee's previous disclosures (as contained in previous disclosure database 15) and presents the previous disclosures to the employee in any suitable format. Referring now to FIG. 8, there is shown a screenshot 801 in which an employee's previous disclosures/affirmations are displayed in a format according to an exemplary embodiment. The previous disclosures/affirmations included in the example of screenshot 801 include disclosures/affirmations pertaining to Personal Securities Accounts 803, Private Securities Transactions 805, Outside Business Activities 807, Regulatory Disclosures 809 and Policies and Procedures 811. For each of the disclosures/affirmations, a date 813 is provided indication when the employee last provided the particular disclosure/affirmation.

Disclosure engine 17 then determines (as described above) what disclosures/affirmations, if any, the employee must still provide and sends to employee access device 19 a form via which such disclosures/affirmations may be made by the employee.

In another exemplary embodiment, system 1 continuously checks the status of disclosures/affirmations contained in previous disclosure database 15 for each employee included in employee database 13. If disclosure engine 17 determines that the disclosures/affirmations for any given employee require updating, disclosure engine 17 communicates this requirement to the particular employee using any available method such as, by way of non-limiting example, electronic mail, instant messaging, fax or any non-electronic methods.

The communication from disclosure engine 17 to the employee may also include the suitable disclosure/affirmation. Alternatively, upon receiving the notification, the employee uses employee access device 19 to access disclosure engine 17 for providing the requested disclosures/affirmations.

Figure 4:
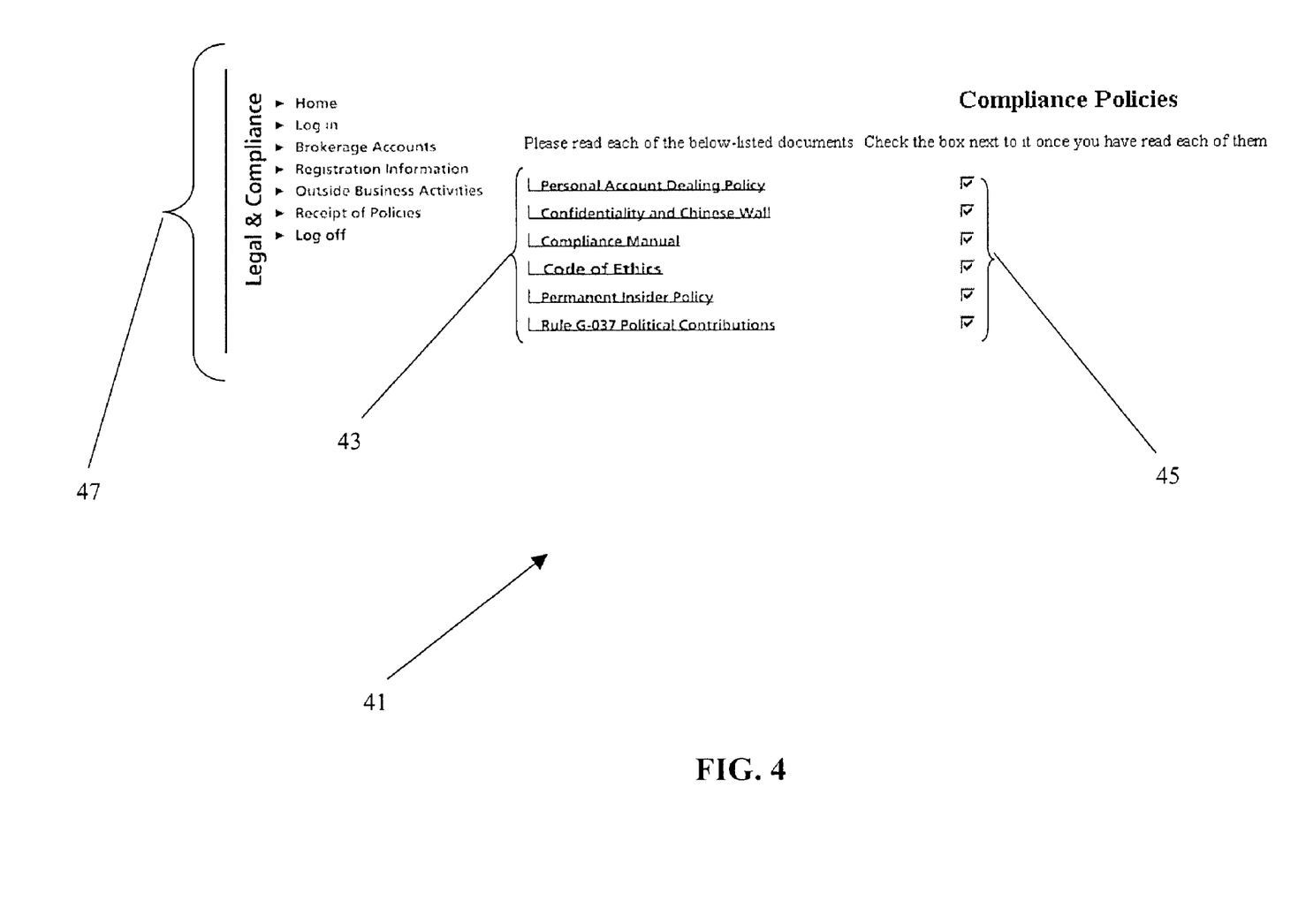
FIG. 4 is a screenshot for receiving updates to disclosures/affirmations according to an exemplary embodiment of the present invention.

Referring now to FIG. 4, there is shown an exemplary screenshot 41 via which disclosure engine 17 requests that an employee update various disclosures/affirmations, as required. Screenshot 41 includes a disclosure section 43 that contains references to the disclosures/affirmations that disclosure engine 17 has determined requires a response from the particular employee. In the example of FIG. 4, the employee is being requested to read the organization's Personal Account Dealing Policy, Confidentiality and Chinese Wall policy, Compliance Manual, Code of Ethics, Permanent Insider Policy and Political Contribution rules. The employee may view any of the policies/manuals/rules included in disclosure section 43 by activating the corresponding reference (for example, by clicking on the reference with a mouse). Once the employee has read the policies/manuals/rules, the employee is instructed to check a corresponding check box 45 indicated that the employee has read the corresponding policy/manual/rule and affirms the employee's consent to their contents.

Figure 5:
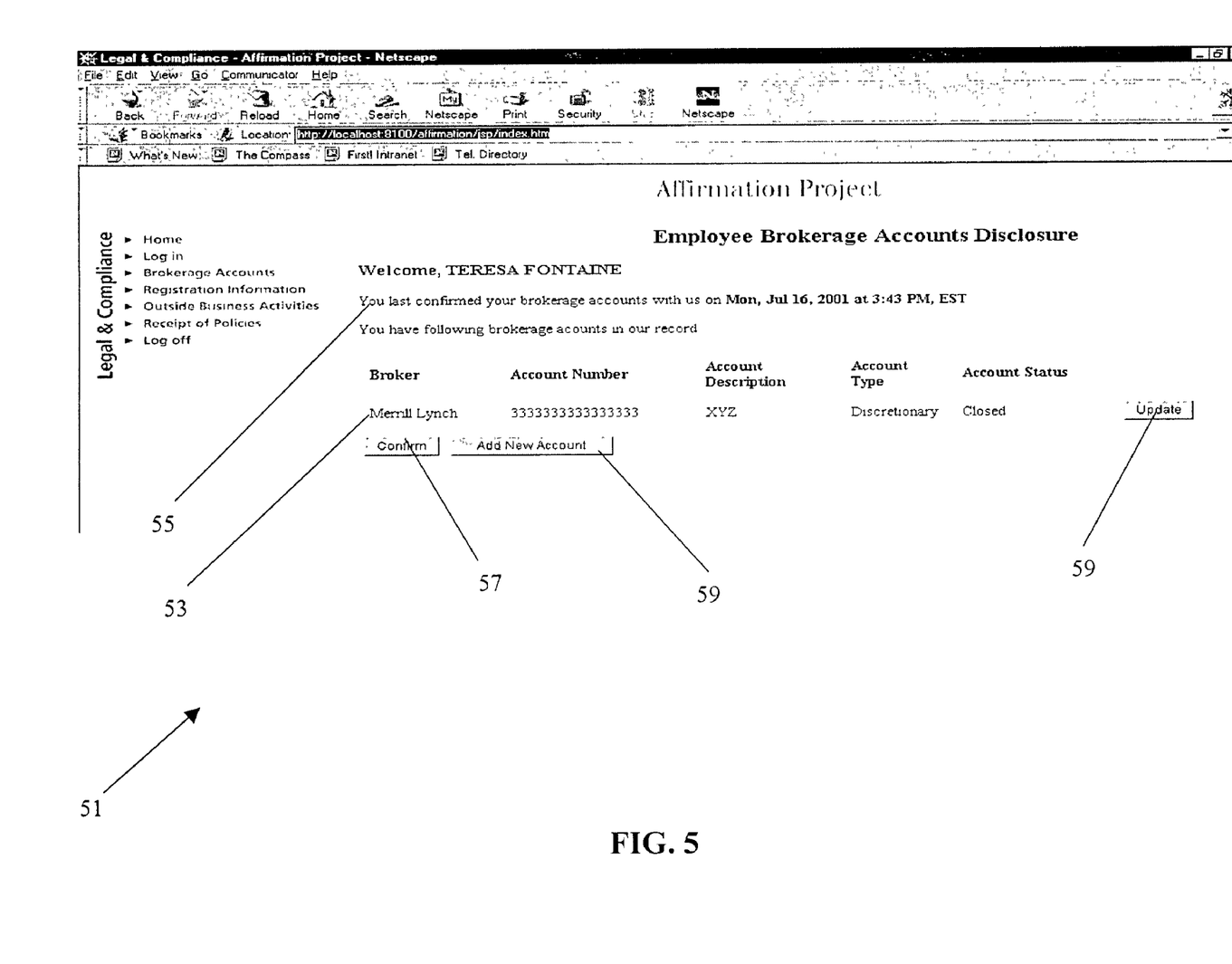
FIG. 5 is an employee brokerage account disclosure screenshot according to an exemplary embodiment of the present invention.

Screenshot 41 also includes a navigation section 47 via which an employee may check the status of the employee's disclosures/affirmations and make changes as necessary. For example, by activating a "Brokerage Accounts" reference in navigation section 47, the employee is presented with a brokerage account disclosure screenshot 51, as shown in FIG. 5. Screenshot 51 includes a previous disclosure section 53 that lists the brokerage accounts previously disclosed by the employee (as stored by previous disclosure database 15). Screenshot 51 also includes a disclosure history section 55 that indicates the last time the employee has confirmed the employee's brokerage account status (as reflected by previous disclosure database 15). If the brokerage information is still current, the employee may reaffirm the information by activating (for example, with a mouse) a confirm button 57. Once the employee confirms the brokerage account information, disclosure engine 17 updates previous disclosure database 15 accordingly.

Figure 6:
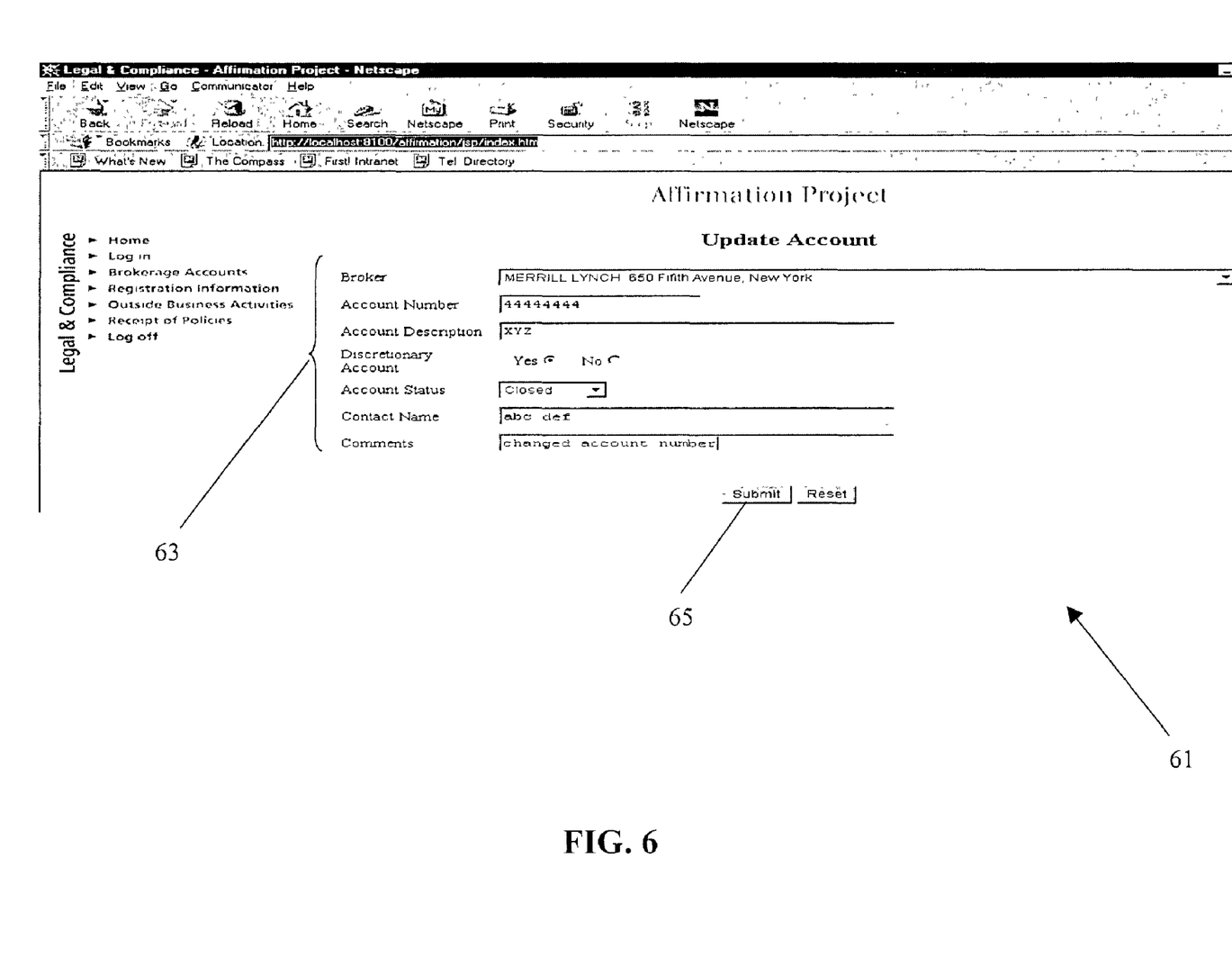
FIG. 6 is a brokerage account update screenshot according to an exemplary embodiment of the present invention.

If the employee must update the brokerage information, the employee activates an update button 58 in which case disclosure engine 17 presents an update account screenshot 61, as shown in FIG. 6. Update account screenshot 61 includes a fields section 63 that displays the current brokerage account information that the employee can edit. Once the employee makes the necessary changes, the employee activates a submit button 65 to submit the updates to disclosure engine 17 (that in turn updates previous disclosure database 15).

Figure 7:
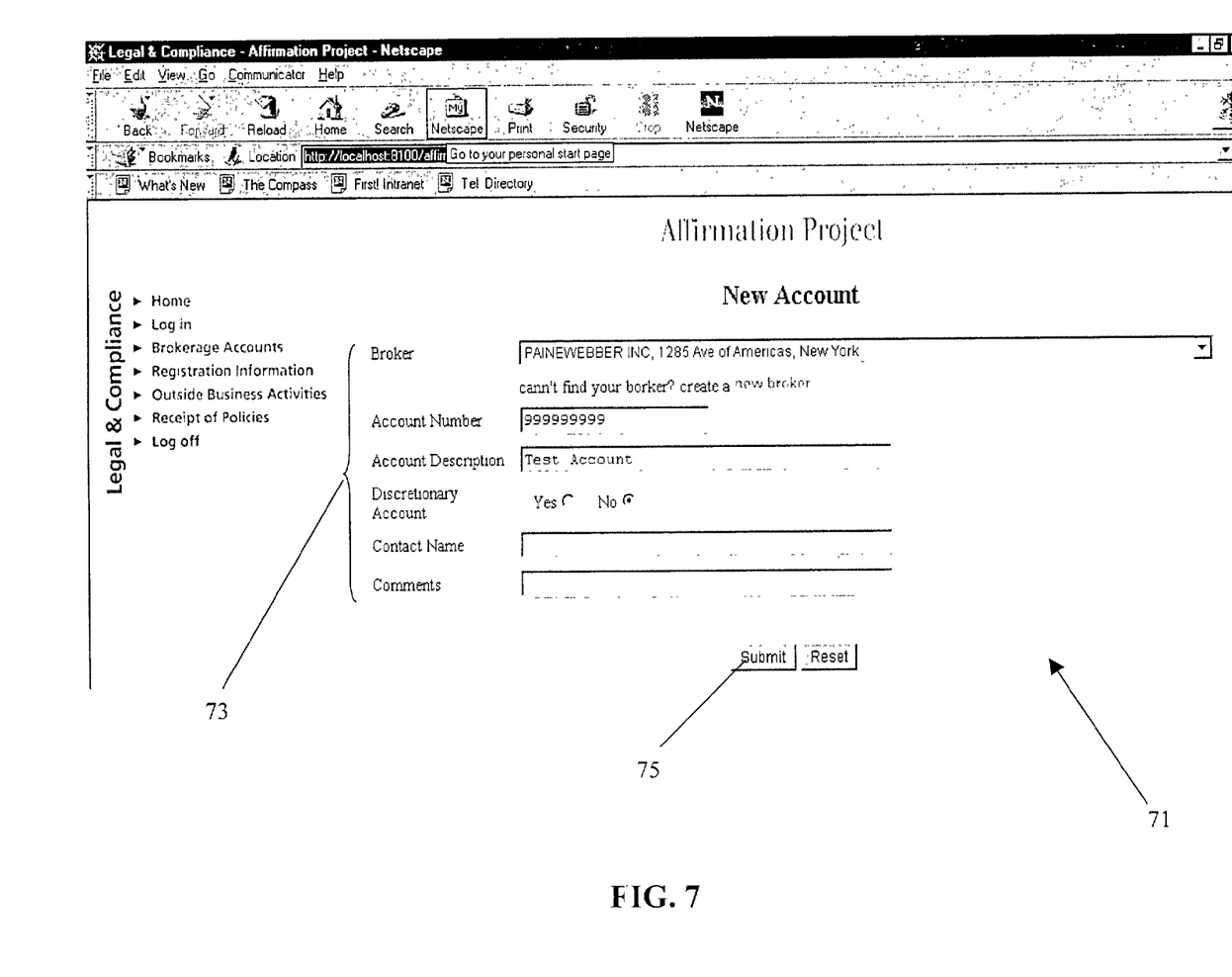
FIG. 7 is an add new brokerage account screenshot according to an exemplary embodiment of the present invention.

If the employee has to add a new brokerage account, the employee activates an add new account button 58 in which case disclosure engine 17 presents a new account screenshot 71, as shown in FIG. 7. New account screenshot 71 includes a fields section 73 in which the employee can enter the new account information. Once the employee enters the information, the employee activates a submit button 75 to submit the updates to disclosure engine 17 (that in turn updates previous disclosure database 15).

Similarly, navigation section 47 includes references Registration Information, Outside Business Activities and Receipt of Policies that, when activated, cause screenshots pertaining to registration information outside business activities and policies to be presented to the employee for further disclosures and/or affirmations. Aside from these references, navigation section 47 may include any other reference for presenting screenshots to an employee regarding any other type of disclosure/affirmation.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Access device 19 can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computerized system for tracking employee disclosure and affirmation information, comprising:
    an employee database for storing employee status information for a plurality of employees of an employer, said employee status information including employee type, wherein the employee type represents a position or function of an employee within the employer;
    a previous disclosure database for storing any previous disclosures and affirmations provided by said plurality of employees; and a disclosure engine comprising a processor, said disclosure engine maintaining a list of different types of disclosures and affirmations required by a governmental entity or by said employer for each employee type, such that the required types of disclosures and affirmations for at least one employee type is different than the required types of disclosures and affirmations for another employee type, said disclosure engine determining the required types of disclosures and affirmations from the list for at least one of the plurality of employees that correspond to said employee type of said employee, said disclosure engine obtaining from said previous disclosure database said any previous disclosures and affirmations provided by said employee, said disclosure engine determining any additional disclosure or affirmation of the required types of disclosures and affirmations not satisfied by said any previous disclosures and affirmations, and said disclosure engine forwarding to a computerized access device operated by said employee a disclosure form for providing said additional disclosure or affirmation.

2. A computerized method for tracking employee disclosure and affirmation information, the method comprising a processor executing the steps of:

maintaining a list of different types of disclosures and affirmations required by a governmental entity or by an employer for each employee type, such that the required types of disclosures and affirmations for at least one employee type is different than the required types of disclosures and affirmations for another employee type, wherein the employee type represents a position or function of an employee within the employer;

obtaining employee status information for an employee from an employee database that stores employee status information for a plurality of employees of said employer, said employee status information including employee type;

determining the required types of disclosures and affirmations from the list for said employee that correspond to said employee type of said employee;

obtaining any previous disclosures and affirmations provided by said employee from a previous disclosure database that stores any previous disclosures and affirmations provided by said plurality of employees;

determining any additional disclosure or affirmation of the required types of disclosures and affirmations not satisfied by said any previous disclosures and affirmations; and forwarding to a computerized access device operated said employee a disclosure form for providing said additional disclosure or affirmation.

3. The system of claim 1, wherein said disclosure engine receives from the computerized access device operated by said employee said any additional disclosure or affirmation.

4. The system of claim 1, wherein said list includes at least one from a group of disclosure or affirmation types including brokerage information, registration information, outside business activities, code of ethics, personal account dealing policy, compliance manual and political contributions rule.

5. The system of claim 1, wherein said list includes a time schedule for receiving the required types of disclosures and affirmations from said employee.

6. The system of claim 1, further comprising an access device in communications with said disclosure engine for updating said list for implementing a new disclosure or affirmation policy.

7. The system of claim 1, further comprising a login module, said employee accessing said system by providing employee identification information to said login module via said computerized access device, wherein said login module provides said disclosure engine with said employee identification information for retrieving said employee's status information from said employee database.

8. The system of claim 1, wherein said computerized access device is in communications with said disclosure engine for accessing said any previous disclosures or affirmations.

9. The system of claim 1, wherein said disclosure engine periodically determines whether any additional disclosure or affirmation is required by said employee and communicates said disclosure requirements to said employee.

10. The method of claim 2, further comprising the step of: receiving from the computerized access device operated by said employee said additional disclosure or affirmation.

11. The method of claim 2, wherein said list includes at least one from a group of disclosure or affirmation types including brokerage information, registration information, outside business activities, code of ethics, personal account dealing policy, compliance manual and political contributions rule.

12. The method of claim 2, wherein said list includes a time schedule for receiving the required types of disclosures and affirmations from said employee.

13. The method of claim 2, further comprising the steps of: providing employee identification information to a login module via said computerized access device; and retrieving said employee status information based on said employee identification information.

14. The method of claim 2, further comprising the steps of: periodically determining whether any additional disclosure or affirmation is required by said employee; and communicating said disclosure requirements to said employee.

15. The system of claim 3, wherein said disclosure engine updates said previous disclosure database based on said any additional disclosure or affirmation.

16. The system of claim 5, wherein said previous disclosure database includes a time when said any previous disclosures or affirmations were provided by said employee.

17. The system of claim 9, wherein said disclosure engine communicates said disclosure requirements to said employee via said computerized access device.

18. The system of claim 9, wherein said disclosure engine communicates said disclosure and affirmation requirements using a method selected from the group including electronic mail, instant messaging, facsimile web access and mail.

19. The method of claim 10, further comprising the step of: updating said previous disclosures or affirmations based on said any additional disclosure or affirmation.

20. The method of claim 12, further comprising the step of: storing a time when said any previous disclosures or affirmations were provided by said employee.

21. The system of claim 16, wherein said disclosure engine determines whether any additional disclosures or affirmations are required by said employee based on said time schedule and said time when said any previous disclosures or affirmations were provided by said employee.

22. The method of claim 20, further comprising the step of: determining whether any additional disclosures or affirmations are required by said employee based on said time schedule and said time when said any previous disclosures or affirmations were provided by said employee.

* * * * *